R. G. ROSSER.
VALVE CLEANER.
APPLICATION FILED JAN. 4, 1916.
1,180,191.
Patented Apr. 18, 1916.
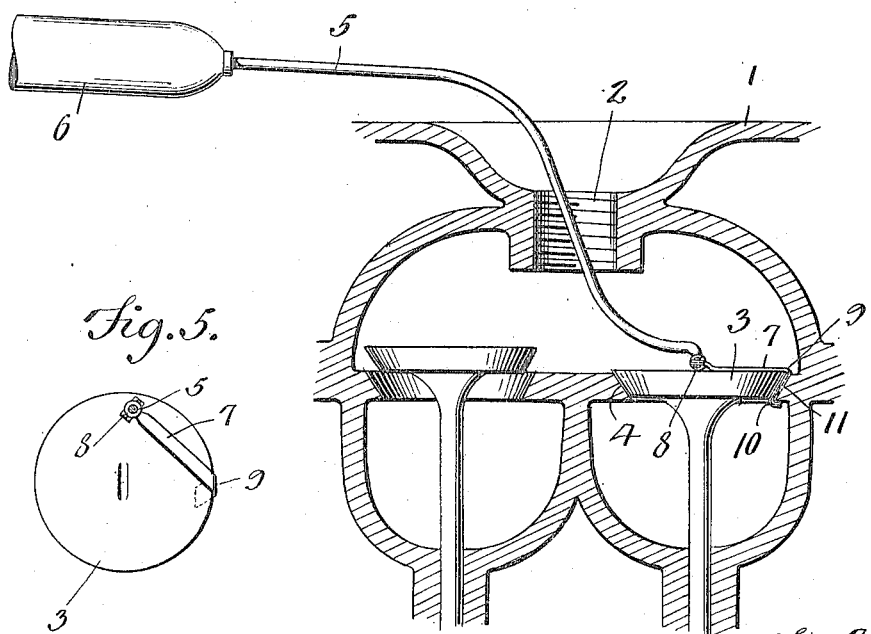
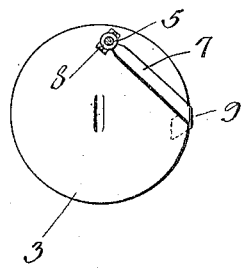
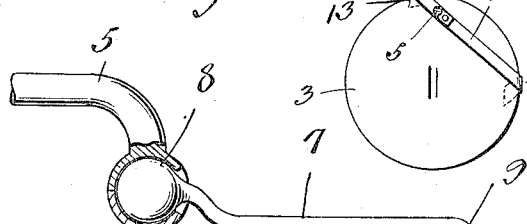
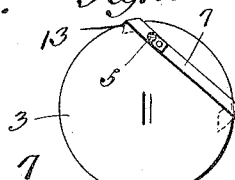
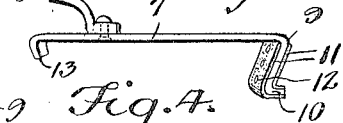
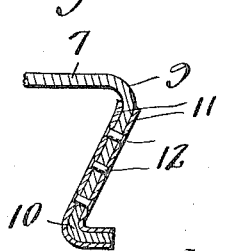
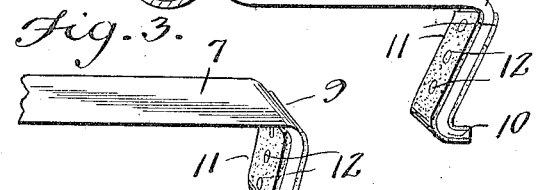
Inventor
R. G. Rosser,
By Victor J. Evans
Attorney
Witnesses

UNITED STATES PATENT OFFICE.

ROBERT G. ROSSER, OF BROADWAY, NORTH CAROLINA.

VALVE-CLEANER.

1,180,191. Specification of Letters Patent. Patented Apr. 18, 1916.

Application filed January 4, 1916. Serial No. 70,324.

*To all whom it may concern:*

Be it known that I, ROBERT G. ROSSER, a citizen of the United States, residing at Broadway, in the county of Lee and State of North Carolina, have invented new and useful Improvements in Valve-Cleaners, of which the following is a specification.

This invention relates to valve cleaners especially adapted to be used for removing carbon from the valve and valve seat of a hydro-carbon engine and it consists in the novel features hereinafter described and claimed.

An object of the invention is to provide an implement of the character indicated which is of simple structure and which may be conveniently used for removing the carbon from a valve and valve seat of an engine such as is employed upon the Ford automobile.

With the above object in view the cleaner includes a curved shank having a blade pivotally mounted at one end thereof and a handle grip mounted at the other end. The blade is provided along its length with two distinct curves, one of which is adapted to fit around the edge of the valve when the device is in use and the other adapted to fit around the lower edge of the valve seat. The portion of the blade between the said curves carries at its opposite side strips of emery cloth suitably secured thereto and the implement is manipulated in a manner to cause the emery cloth to pass around the valve and valve seat whereby the carbon is removed therefrom. The shank of the implement is insertible through the opening which usually receives the spark plug of the engine and the device may be easily and readily manipulated to cause the blade to pass around the valve and valve seat inasmuch as the blade is of a shape which coöperates with the curvature of the valve and valve seat to cause the same to move around the said parts when the shank of the implement is properly manipulated.

In the accompanying drawing:—Figure 1 is a sectional view of part of a hydrocarbon engine showing the implement applied. Fig. 2 is an edge view of the implement with parts shown in section. Fig. 3 is a top plan view of part of the implement. Fig. 4 is a sectional view of the same. Fig. 5 is a reduced top plan view of a valve showing the implement applied. Fig. 6 is a similar view showing a modification of the implement. Fig. 7 is an edge view of the modified form of implement shown in Fig. 6.

As illustrated in the accompanying drawing, the top of the engine 1 is provided at an intermediate point with an opening 2 which usually receives and retains the sparking plug (not shown). The valve 3 is positioned at one side of the top of the engine 1 and is arranged to close against the seat 4 in the usual manner as the stem of the valve is moved by the cam which operates the valve mechanism. In view of the fact that the said cam and other parts of the valve operating mechanism constitute no part of the present invention, they are not shown. The valve cleaner comprises a shank 5 which is longitudinally formed substantially in the shape of a compound curve. A handle grip 6 is mounted at one end of the shank 5. A blade 7 is pivotally connected by means of a ball and socket joint 8 with the other end of the shank 5. The blade 7 is provided with spaced curves 9 and 10 and the material between the said curves is disposed at an angle to the median longitudinal dimension of that portion of the blade which is connected with the shank 5. Strips of emery cloth 11 are attached to the opposite sides of the blade 7 and along that portion which lies between the curves 9 and 10 and the said strips are provided with pins 12 which pass transversely through the blade 7 and which serve as means for securing the said strips in position at the opposite sides of the blade. In practice the strips 11 are made with the pins 12 of soft material, such for instance as lead, attached thereto, and after the said pins have been passed transversely through the blade and the pin which is connected with the strip at one side is passed through the strip at the opposite side and is then flattened whereby the pin attached to one strip serves in part as means for securing the strip at the opposite side of the blade in position.

If desired to remove the carbon from the periphery of a valve and the surface of a valve seat, the sparking plug above referred to is removed from the top of the engine 1 and the blade is inserted through the said opening. The shank 5 is caused to follow the blade through the opening and after the valve has been raised with relation to the seat, the blade 7 is positioned over the upper side of the valve so that the curve 9 is around the edge of the valve and the curve 10 around the lower edge of the valve seat. That portion of the blade 7 which lies between the curves 9 and 10 is disposed between the periphery of the valve and the surface of the valve seat. The valve 4 may then be lowered so that the blade 7 is held but not bound between the valve and the valve seat. The shank 5 may then be manipulated by using the handle 6 whereby the blade 7 is caused to rotate around the periphery of the valve and the surface of the valve seat and inasmuch as the roughened surfaces of the emery cloth strips 11 come in contact with the periphery of the valve and the surface of the valve seat, the said roughened surfaces cut and remove the accumulations of carbon from the said part and surface.

By reason of the fact that that portion of the blade 7 which is between the curves 9 and 10 is disposed at an acute angle to the median longitudinal dimension of that portion of the said blade which is connected with the shank when the shank 5 is moved longitudinally the said portion bearing against the edge of the valve causes the blade to turn around the periphery of the valve. By properly manipulating the shank 5 the said blade 7 may be caused to describe complete rotation around the periphery of the valve and around the valve seat.

In the form of the invention as shown in Figs. 6 and 7 the blade 7 is provided at that end which is nearest the shank 5 with an additional curve 13 adapted to fit around one edge of the valve 3 and which assists in holding the blade in proper position upon the valve during the cleaning operation. If desired a small quantity of oil may be applied to the abrading material 11 just before the device is used to clean the valve and after the valve has been cleaned any oil that adheres thereto may be removed by wiping or covering the blade with thin absorbent material.

From the above description taken in conjunction with the accompanying drawing, it will be seen that an implement of simple and durable structure and especially adapted to be used for cleaning a valve and valve seat is provided and that the device may be easily and quickly applied to the valve and valve seat without removing an excessive number of parts of the engine.

Having described the invention what is claimed is:—

1. A valve cleaner comprising a curved shank, a blade pivotally connected with the shank and having a curve adapted to fit around the edge of a valve and another curve adapted to fit around the edge of the valve seat and abrading material carried by the blade and located between the said curves thereof.

2. A valve cleaner comprising a shank, a blade pivotally connected with the shank and having a curve adapted to fit around the edge of a valve and another curve adapted to fit around the edge of a valve seat, that portion of the blade which lies between the said curves being disposed at an acute angle to the median long dimension of that portion of the blade which is connected with the shank and abrading material carried by that portion of the blade which lies between the said curves thereof.

3. A valve cleaner comprising a shank, a blade located at the end of the shank, a ball and socket joint pivotally connecting the blade with the shank, said blade having a curve adapted to fit around the edge of a valve and another curve adapted to fit around the edge of a valve seat and abrading material applied to the blade between the said curves thereof.

4. In a valve cleaner a blade having a curve adapted to fit around the edge of a valve, said blade having another curve adapted to fit around the edge of a valve seat, the portion of the blade between the said curves being provided with openings, strips of material carrying abrading substances applied to the blade between the said curves and pins passing transversely through the openings of the blade and the said strips of material.

In testimony whereof I affix my signature in presence of two witnesses.

R. G. ROSSER.

Witnesses:
 Henry M. Spears,
 Enoch McLeod.

Copies of this patent may be obtained for five cents each, by addressing the "Commissioner of Patents, Washington, D. C."